START-STOP SYNCHRONOUS DATA TRANSMISSION SYSTEM

Filed July 6, 1965 7 Sheets-Sheet 1

INVENTORS
ALVIN W. BROOKE
HARRY C. KUNTZLEMAN
HAROLD G. MARKEY
BY [signature]
AGENT June 11, 1968 A. W. BROOKE ET AL 3,388,216

START-STOP SYNCHRONOUS DATA TRANSMISSION SYSTEM

Filed July 6, 1965 7 Sheets-Sheet 2

June 11, 1968 A. W. BROOKE ET AL 3,388,216

START-STOP SYNCHRONOUS DATA TRANSMISSION SYSTEM

Filed July 6, 1965 7 Sheets-Sheet 4

June 11, 1968 A. W. BROOKE ET AL 3,388,216

START-STOP SYNCHRONOUS DATA TRANSMISSION SYSTEM

Filed July 6, 1965 7 Sheets-Sheet 7

United States Patent Office 3,388,216

Patented June 11, 1968

3,388,216
START-STOP SYNCHRONOUS DATA TRANSMISSION SYSTEM

Alvin W. Brooke, Endicott, Harry C. Kuntzleman, Newark Valley, and Harold G. Markey, Endicott, N.Y., assignors to International Business Machines Corporation, Armonk, N.Y., a corporation of New York Filed July 6, 1965, Ser. No. 469,491
8 Claims. (Cl. 178—53.1)

ABSTRACT OF THE DISCLOSURE

An electronic control means for maintaining a data receiving terminal in synchronism with a data transmitting terminal comprising a multivibrator in combination with a clock counter and a related trigger for producing timing pulses. A phase counter monitors the "received data" line and through appropriate circuitry a determination is made as to when to advance or retard the clock counter so as to keep it in step with the transmitting terminal.

Figure 1:
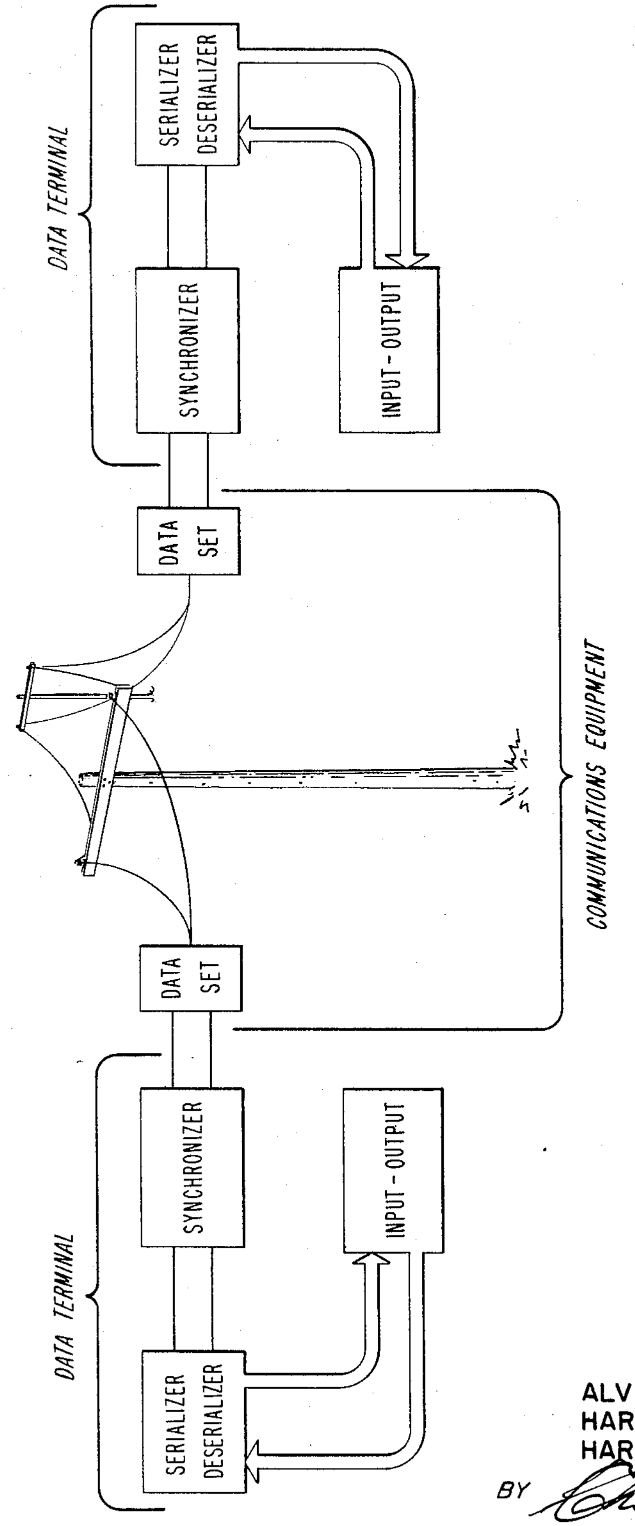

This invention relates to a data transmission system for conveying intelligence in coded form, and more particularly, to the improvements in the means for synchronizing a receiving terminal with a transmitting terminal.

For a data communication system to operate properly, it is necessary that the sending and receiving devices have some agreement as to how fast the information is to be sent. Coordination in this respect is provided by synchronization equipment. At the transmitter some form of clock times the introduction of the data into the communication channel. At the receiver, a device is present which, either by some form of prior timing knowledge or by examination of the arriving signal wave, times its treatment of the signal wave so that each data bit and character is neither lost nor reproduced more than once at the receiver. Both bit synchronization and character synchronization must be obtained and maintained.

Generally, synchronization systems are classified as either synchronous or asynchronous. Synchronous systems provide for a uniform speed of digital transmission so that no more time is taken for one bit or character than for any other. For synchronous character synchronization, character times are of equal length and characters are transmitted successively. Idle or null characters are transmitted if no data is to be transmitted. For synchronous bit synchronization bit times are at equal length and follow each other successively.

Asynchronous systems utilize some distinctive line signal to accompany each character to notify the receiver that a data element is arriving at a particular time. Such a system may operate at a constant speed just as does a synchronous system, or it can be used at a variable rate. The synchronization signal may be any one which is distinguishable from the data portion of the message or which allows for the timing information to be extracted from a property of the data waveform.

A very important use of a combination of asynchronous and synchronous timing systems is found in the start-stop system in which the sequence of binary states representing a character is always preceded by a stop signal and a start signal. The transition between these is used as the reference timing point for the character, the bits of the character being spaced out after it at equal intervals. Thus, the character timing is asynchronous while the individual bit timing within a character is synchronous.

The above discussed start-stop system of synchronization has attendant limitations with respect to the speed of transmission. An extension of the speed of data communications systems into the higher Baud (a unit of signalling speed in data transmission equal to the number of bits per second) region runs into problems because of the unreliability of the stop-start method due to jitter, noise, and fortuitous distortion as it affects the stop to start transition and the differences between the nominal rates of the clocks at the transmitting and receiving terminals.

Another means of obtaining bit timing frequently is used with combined synchronous character and synchronous bit systems where bits are transmited continuously. The receiving terminal will obtain information from all signal transitions concerning the speed of the transmitting device and utilize this information to control the rate and phase of the receiving terminal clock. An inertial or "flywheel" affect may be incorporated in the receiving device so that jitter and fortuitous distortion of individual signal transitions do not adversely affect the clock and synchronization.

Accordingly, it is a primary object of the present invention to provide a simple and improved means of controlling the synchronism of the receiving and transmitting terminals within a data transmission system.

It is an object of this invention to produce a simple, efficient effective and economic synchronization means for receiving and/or transmitting multi-element code signals.

Another object of this invention is to produce an unique synchronizing system having a circuit which may be adjusted so as to automatically compensate for transmitters which transmit coded signals at too fast or too slow a rate.

Another object of this invention is to produce a unique synchronizing device which may be used as an adjunct to Stop-Start system devices without materially affecting the functional operation of the Stop-Start system devices.

Briefly, the instant invention uses a bit synchronous scheme for bits transmission but retains the start-stop principle for character determination. The sampling of bits is controlled by a variable clock which is keeping step with the transmitting clock. A transition coding, wherein "1" is represented by a transition and a "0" by no transition, is used for the stop signal (continuous mark condition) and start signal when no data bits are being transmitted. State coding, wherein a "1" is represented by an up level and a "0" by a down level, is used for the transmission of data bits. A multivibrator operating at 40 times Baud rate and in combination with a trigger produces the timing pulses. A clock counter and a related trigger driven by the timing pulses serves to provide strobe pulses. A phase counter monitors the "receive data" line and through appropriate circuitry a determination is made as to when to advance or retard the clock counter so as to keep it in step with the transmitting terminal.

A sync reset latch for properly starting and stopping the clock counter and a "clear to send" signal delay is provided for "turn around" in half duplex operation.

The foregoing and other objects, features and advantages of the invention will be apparent from the following more particular description of a preferred embodiment of the invention, as illustrated in the accompanying drawings.

In the drawings:

FIG. 1 is a schematic diagram of a data communication system employing the synchronizing apparatus of the subject invention.

Figure 2A:
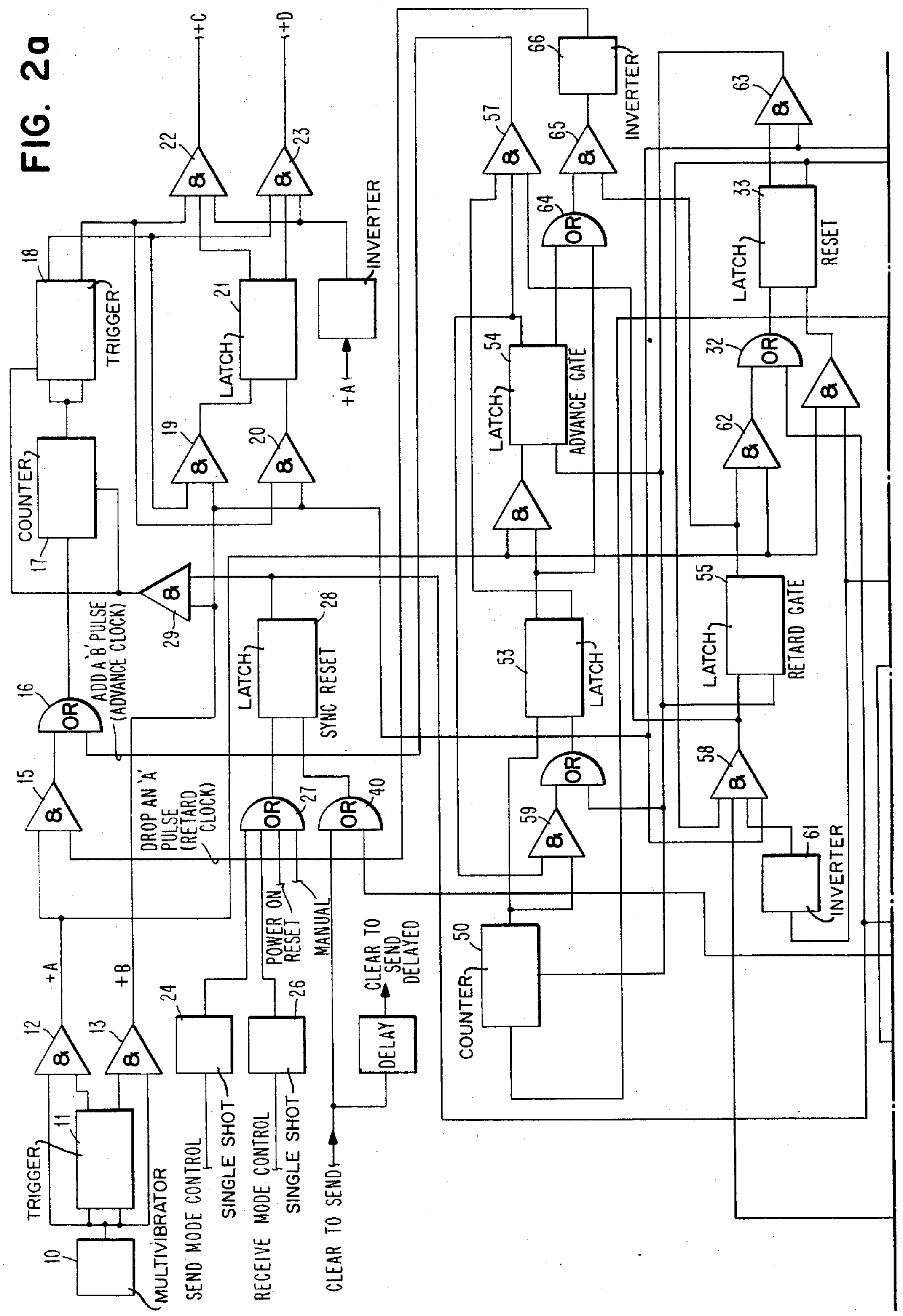
Figure 2B:
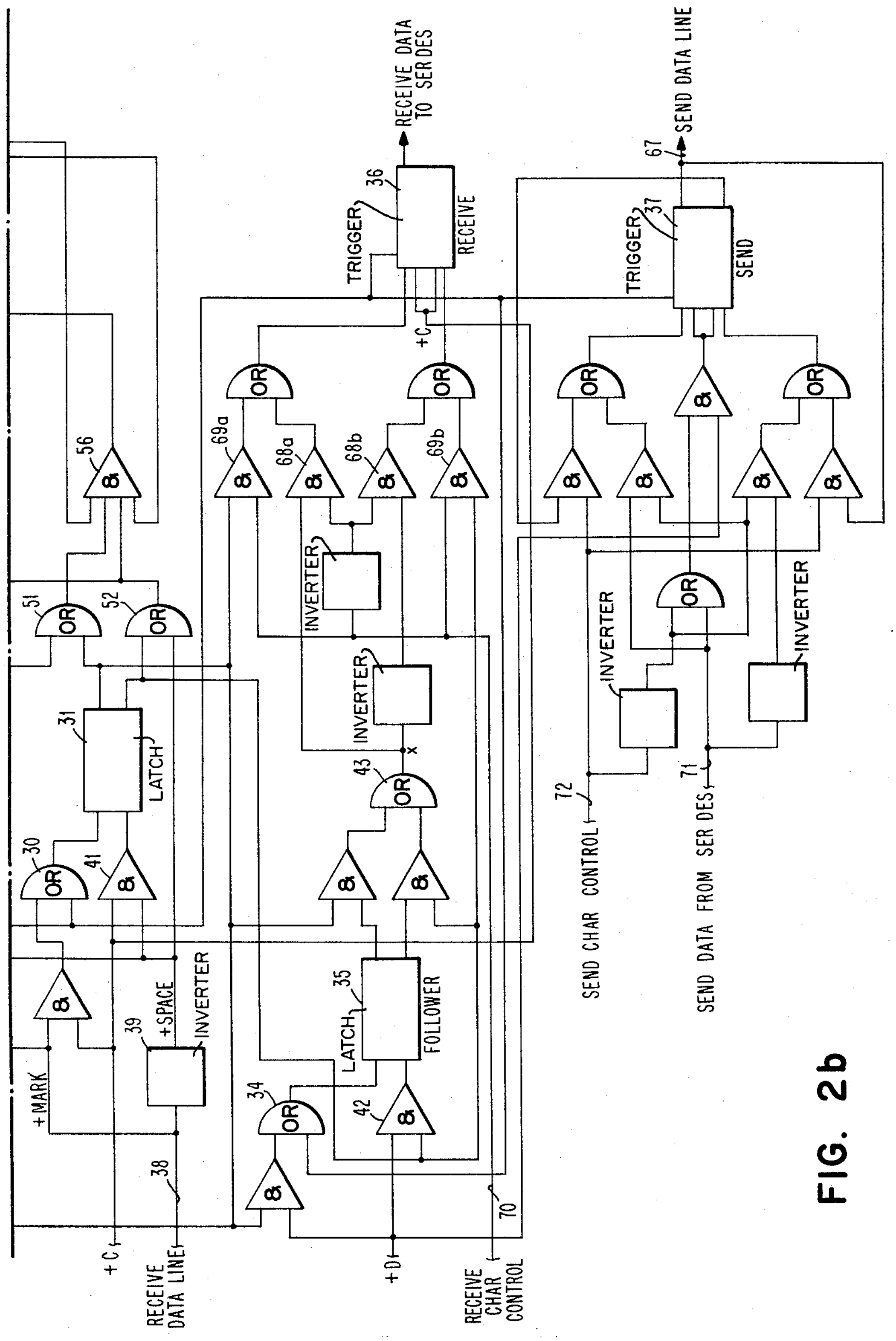

FIGS. 2*a* and 2*b* together constitute a schematic diagram of the synchronizer circuitry, and wherein FIG. 2*a* should be placed above FIG. 2*b*.

Figure 3A:
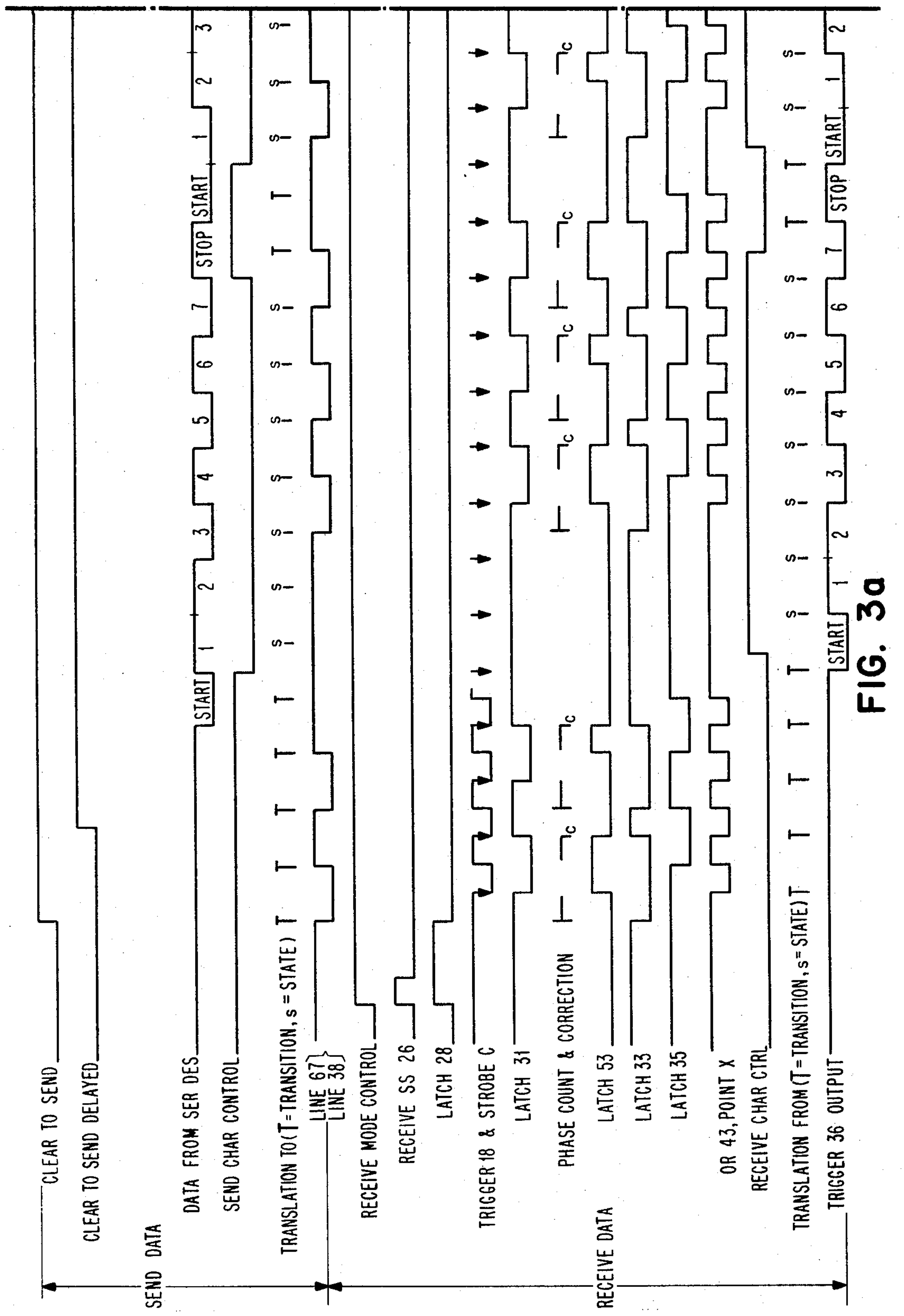
Figure 3B:
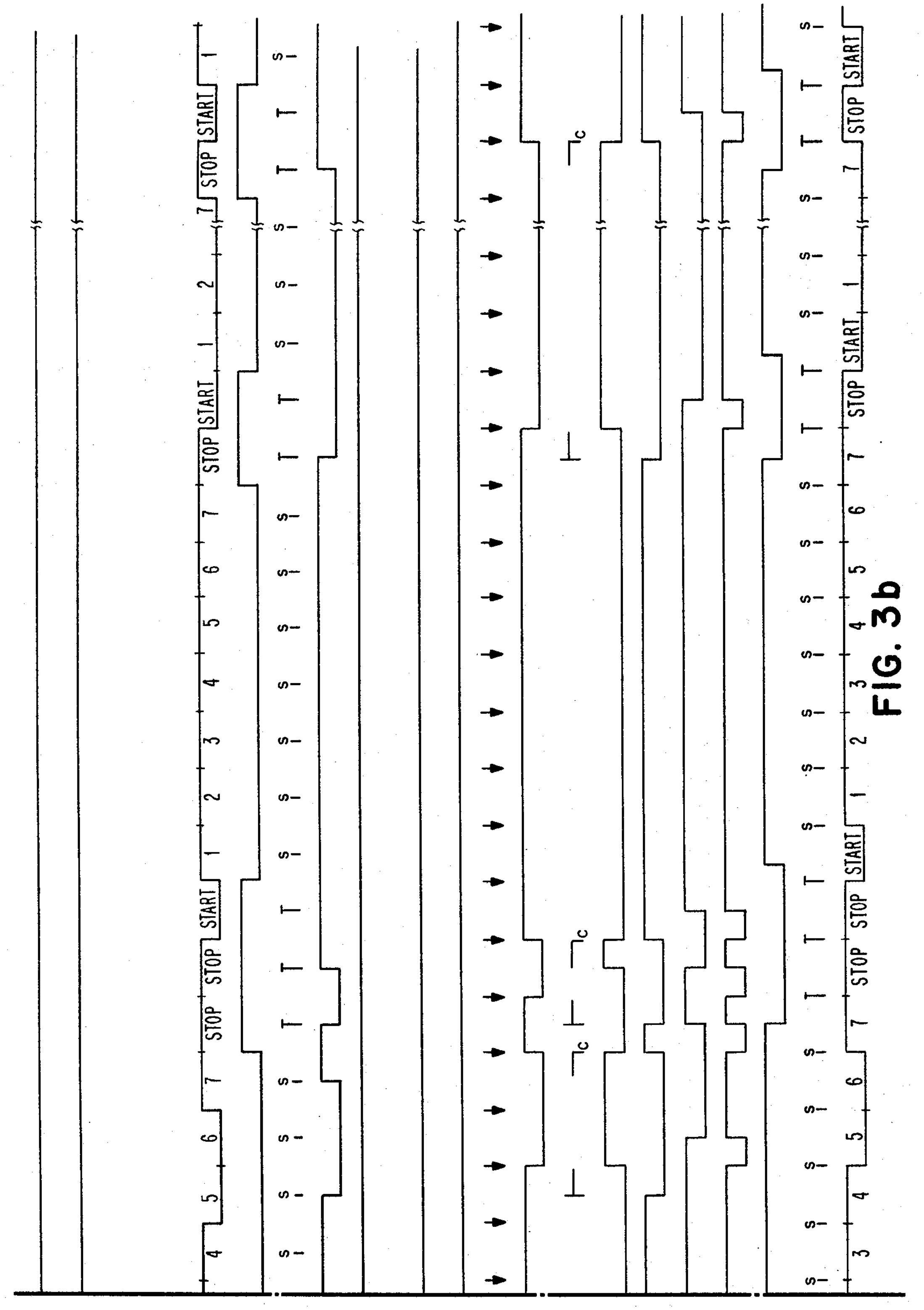

FIGS. 3*a* and 3*b*, placed in juxtapositon, form a logic timing diagram depicting the operation of the synchronizer circuitry.

Figure 4A:
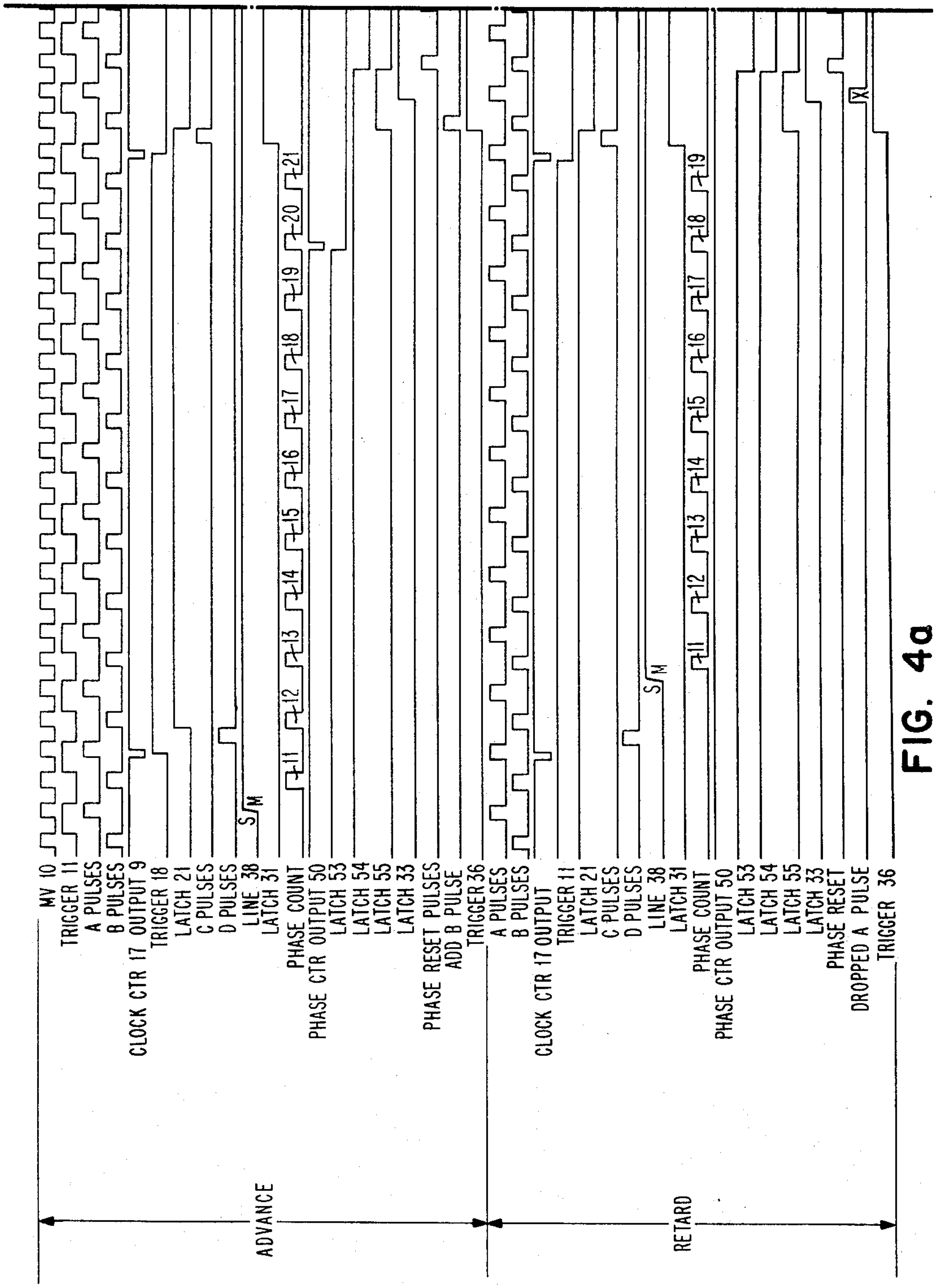
Figure 4B:
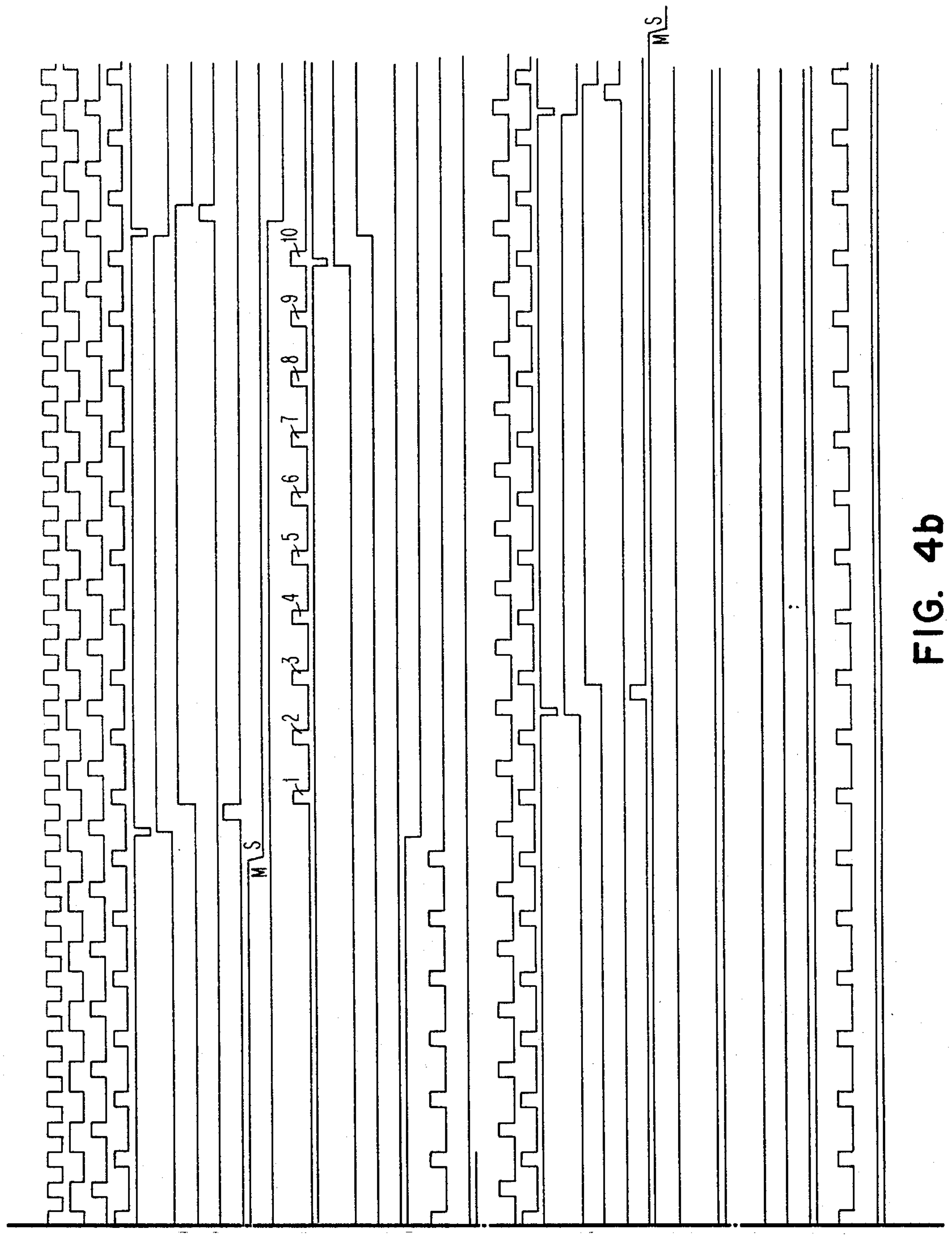

FIGS. 4*a* and 4*b*, placed in juxtaposition, form a timing diagram for the clock timing and show the advance and retard operations for the clock to keep the system in synchronism with the transmitting terminals.

The circuit drawings are functional diagrams each symbol used standing for a device performing a particular function, the physical nature of the device and its manner of performing the function being well known. Thus, the symbol C has been used to denote an AND circuit function wherein concurrent inputs are required to provide an output; the letters OR have been used to denote an OR circuit function wherein one or more inputs will provide an output; the letters SS have been used to denote a single shot circuit function which provides a monostable output pulse for each input triggering pulse; the letter I has been used to denote an inverter circuit function; the letter L has been used to denote a latch circuit function which may be defined as a bistable circuit having two inputs and shiftable from one of its stable states to the other and return in response to input signals applied alternately to the two inputs; and in other words, an input signal at one input latches the circuit in a particular one of its stable states and it is not released from that stable state to its other stable state until a signal is received at the opposite input; and the letter T has been used to denote a trigger circuit function; the letters CTR have been used to denote a counter circuit function wherein are counted modulo N, pulses that occur on the left input line with a pulse placed on the right output line when the count goes from N–1 to zero. The counter is reset to zero when a pulse occurs on the input line at the bottom; the letters MV have been used to denote a multivibrator circuit function.

FIG. 1 shows a typical data communications transmission system having data terminals which may communicate with each other. The instant invention concerns itself with the synchronizer portion of the data terminal.

With reference to FIGS. 2*a* and 2*b*, all symbols depicting the circuitry have the input signals on the left side with the output signals being from the right side of the symbol. With regard to latch and trigger circuits an input to the upper portion of the symbol will set the latch or trigger to its "ON" condition and input to the lower portion of the symbol will set the latch or trigger to its "OFF" condition.

*Timing pulses*

In the upper portion of FIG. 2*a* there is shown a multivibrator 10, which in the preferred embodiment of the present invention has been designed to operate at 40 times the Baud rate of 1200 which makes the operating frequency of the multivibrator 10 equal to 48 kc. It is to be clearly understood that the choice of operating frequency is made only by way of example and is not intended as a limitation on the scope of the invention since other frequencies could be made equally applicable to other speed rates.

The output pulses from multivibrator 10 serve to pulse the bistable trigger 11. The ON and OFF outputs from trigger 11 are gated by the multivibrator 10 output pulses in the AND circuits 12 and 13, respectively and thereby alternately provide the A and B pulses as shown in the timing chart of FIG. 4. The A pulses are passed through the normally "up" gated AND circuit 15 and OR circuit 16 to drive a clock counter 17. The clock counter 17 can be a conventional modulo N counter and in this embodiment is capable of counting 10 input pulses after which it provides an output pulse that is applied to the clock trigger 18 for alternatively triggering the clock trigger 18 after every ten A pulses applied as an input to the clock counter 17. The clock trigger 18 outputs are applied to the AND circuits 19 and 20 for gating B pulses to enable the triggering of latch 21. The clock trigger 18 outputs are concurrently applied with outputs from latch circuit 21 and negative A pulse inputs to the AND circuits 22 and 23 to provide C and D strobe pulses at the nominal Baud rate. The C pulses occur in the middle of a bit and the D pulses at the beginning of a bit.

*Receive circuits*

For a data communication system to operate properly, it is necessary that the sending and receiving devices have some agreement as to how fast the information is to be sent. Coordination in this respect is provided by synchronization equipment. It is to the synchronization equipment that the instant invention particularly applies and in such a manner that the receiving terminal can be kept in substantial synchronization with the transmitting terminal.

When a receive operation is initiated the receive mode control signal is applied to a single shot circuit 26 with the output therefrom being applied via the OR switch 27 for turning the sync reset latch 28 to an ON condition. The ON side output from the sync latch 28 gates AND switch 29 for B pulses so as to reset the clock counter 17 and the clock trigger 18; via the OR circuit 30 triggers latch 31 to its ON condition; via OR circuit 32 triggers the reset latch 33 to its ON condition; via the OR circuit 34 triggers the follower latch 35 to its ON condition; and triggers the receive trigger 36 and the send trigger 37 to the ON condition. The receive circuit is now conditioned to receive data characters from the data communication line 38.

The first mark to space transition appearing on the receive data line 38 and applied via the inverter circuit 39 and the OR circuit 40 will trigger the sync reset latch 28 to its OFF condition, thereby releasing clock counter 17 and clock trigger 18 for actuation by A pulses so that one-half a bit time later a C strobe will occur. The pulse output from the inverter 39 is applied as a gate to the AND switch 41 so that the subsequently occurring C strobe pulse will pass through the AND circuit 41 and switch the latch 31 to its OFF condition. The OFF side output of latch 31 gates the AND circuit 42 for the succeeding D pulse which occurs one-half data bit later in time and triggers the follower latch 35 to its OFF condition. The succeeding C strobe pulse will introduce the next succeeding data bit into the latch 31 so that the first bit will be stored in the follower latch 35 and the succeeding data bit will be stored in latch 31 which enables a check to detect if a transition has occurred on the line 38.

This change is detected at the OR circuit 43 and serves to control or gate the AND's **68*a*, 68*b* and following circuitry in such a manner that C strobe pulses will accordingly control the actuation of the trigger 36 for the purpose of passing information received in a transition coding mode to the serializer-deserializer (SERDES) in a state coding mode. As alternating transitions are received, indicating a successive series of "1's" these are passed on to the SERDES in a series of "1's" in state coding mode which appear to the SERDES as a continuous mark or stop signal condition. A start signal or "0" bit will be received in transition coding as no transition and will be passed to the SERDES as a "0" bit in the state coding mode. The SERDES will recognize this as a space or start signal and will prepare to receive the following bits of the character. It will indicate this to the synchronizing device by means of the Receive Character Control line 70 which will deactivate AND's 68*a*, 68*b* and activate AND's 69*a*, 69*b*. The following information on the receive data line 38 which according to the procedure for data bits following the start bit, should be in state coding, and will be transferred from latch 31 by means of these AND's 69*a*, 69*b* to trigger 36 and the SERDES without modification. These transfers from latch 31 to trigger 36 will occur later in the same C strobe that is sampling the Receive Data Line 38 to set latch 31**.

As the SERDES receives the last data bit of the character it will so indicate to the synchronizing device by removing the indication on the Receive Character Control line 70 which will deactivate the gates **69*a*, 69*b* and activate the gates 68*a*, 68*b*** which will return the circuits to translating transition coded indications to state coded indications for the following stop and start signals.

*Send circuits*

The Send Mode Control indicates the transmitting device is in a sending mode of operation. The initiation of this mode via the SS 24 and OR 27 turns ON Sync Reset Latch 28. This stops the clock and resets the synchronizing device as mentioned previously. The Clear to Send signal from the transmission facilities via OR 40 turns the Sync Reset latch 28 off and the clock is started in the same manner as previously described. The Clear to Send signal is delayed before being passed on to the SERDES or transmitting device.

The send data circuits as appear on the bottom of FIG. 2*b* show a configuration of AND circuits, OR circuits, inverter circuits and a trigger circuit 37. The SERDES will present all information on the Send Data from SERDES line 71 in the State coded form. Before the SERDES has received the Clear to Send Delayed signal, the SERDES will be indicating a continuous mark or stop signal on the Send Data from SERDES line 71. The send data circuits and TRIGGER 37 will translate this to transition coded signals which will be sent out on the Send Data Line 67 as alternating transitions. The purpose of the delayed Clear to Send signal is to insure that some transitions are sent before a character is sent so that the receiving device can start its clock circuits.

When the SERDES or transmitting device begins to send a character, a start signal or space will appear on line 71. According to the preferred system of translation this will be sent as no transition. During this start bit time the SERDES will indicate on the Send Character Control line 72 that it is sending a character. This will deactivate the translation circuits and the succeeding data bits of the character received from the SERDES on line 71 in state coding mode will be passed out to the Send Data Line 67 in state coding mode. During the bit time the SERDES is presenting the last bit of the character it will remove the indication on the Send Character Control line 72. This will activate the translation circuits so as the succeeding stop signal and start signal will be translated to transition coding. It is a requirement of this synchronizing device that the stop signal be an exact multiple in length of a bit time. All bit times are equal in length and at a steady rate. It is desirable to use the C and D strobe pulses of the synchronizing device as clock pulses for the SERDES in the transmitting device.

*Receive synchronizing circuits*

The above sending circuits provide a consistent type of transmission with which the receiving synchronization device can obtain information for it to maintain its receiving clock in step with the clock at the transmitting end.

A phase counter 50 is controlled by OR circuits 51 and 52 and AND circuit 56 which are in turn controlled by the outputs of the latch 31 and the conditions appearing on the receive data line 38. Before the transmission of a data message, the phase counter 50 is reset to a zero condition and the latches 53 and 54 are reset to their OFF condition. The phase counter 50 in conjunction with latches 53 and 54 and the retard gate latch 55 are controlling on the condition of whether the clock counter 17 is to be advanced or retarded to keep it in synchronism with the transmitting terminal. The OR circuits 51 and 52 serve as controlling gates for the AND switch 56 for enabling B pulses from the clock timing circuit to be introduced and actuate the phase counter 50. With reference to the timing chart of FIG. 3, the timing for line 38 in conjunction with the timing for latch 31 and under control of the exclusive OR circuits 51 and 52, the phase counter 50 will count B pulses from a mark-space transition on line 38 until the next C strobe pulse, or approximately one half a bit. On each occasion that the counter 50 reaches a quantity of ten, there will be a spill-over or output pulse which will serve to turn the latch 53 to its ON condition. The subsequently occurring A pulse will turn the advance gate latch 54 to its ON condition. With both latches 53 and 54 in the ON condition, this is indicative that the first spill-over output from the phase counter 50 has occurred. When the next space-mark transition occurs on receive data line 38, phase counter 50 will resume counting again with no intervening reset and count until the next C strobe pulse. This condition is represented by the Phase Count and Correction line of FIG. 3, wherein the horizontal T represents the first half count that occurs from the space to mark transition until strobe, followed by the break or no count condition, and followed by a second half count that occurs from the mark to space transition until strobe or correction instant. The first spill-over output pulse from phase counter 50 may occur in the first part of the count or in the second part of the count depending upon locations of the line 38 transitions. The timing of the turn ON of latch 53 is indicated in the timing chart of FIG. 3, may occur at miscellaneous time.

On the occasion of a second spill-over or output pulse when phase counter 50 reaches the count of ten (a total of twenty) the spill-over pulse will pass through AND switch 59 and turn latch 53 to its OFF condition.

A tabulation of the count and the condition of the latches is as follows:

| | | |
|---|---|---|
| Count Less Than 10 | Latch 53 OFF | Latch 54 OFF |
| Count More Than 10 and Less Than 20. | Latch 53 ON | Latch 54 ON |
| Count More Than 20 | Latch 53 OFF | Latch 54 ON |

AND gate 57 detects when the count is more than twenty and it is desired to advance the clock counter 17. OR gate 64 detects when the count is less than twenty and it is desired to retard the clock counter.

The correction (advance or retard) of the clock counter 17 is just after the C strobe after the space-mark transition on the receive data line 38. The correction required is to add an extra B pulse via OR gate 16 to the input of Clock Counter 17 to momentarily speed it up and advance it in phase, or to suppress an A pulse via AND gate 15 to the input of the clock counter 17 to momentarily slow it down or retard it in phase. Following this, the phase counter 50 is to be reset to zero and the correction latches 53, 54, 55 returned to normal so that the circuits are ready for the next count which will start at the next mark-space transition.

The time of correction is determined by AND circuit 58 and is designed to occur just after the first C strobe pulse after a space-mark transition. At this time a B pulse is emitted from the output of AND gate 58. This pulse turns ON Retard Gate Latch 55. The next A pulse via AND 62 and OR 32 turns on Reset Latch 33. With latch 33 ON the next B pulse via AND 63 turns OFF latch 55. Latch 55 is ON from one B pulse to the next B pulse or in other words is ON during the time one A pulse occurs between the two B pulses. Reset latch 33 is turned OFF when the next mark-space transition occurs. During the time of these events the latches 53 and 54 are remembering the results of the last count which was completed at C strobe time. The status of latch 53 and latch 54 will have conditioned either AND gate 57 for an advance or AND gate 65 for a retard but not both. If an advance is required, the single B pulse from AND 58 is directed via AND 57 to OR 16. If a retard is required, the ON condition of latch 55 is directed via AND 65 and inverter 66 to AND 15 where it suppresses a single A pulse from the stream of A pulses being counted by counter 17.

It is to be noted that the phase of the clock counter 17 is corrected (advance or retarded) by only one count regardless of how far over or under the quantitative value of twenty as determined by the phase counter 50. This is what provides the inertia or "fly wheel" effect previously mentioned. The size of the count value for the modulo N counters determines the amount of the inertia.

The embodiment shown here is for half duplex operation where sending and receiving operations at a terminal device takes place alternatively but not simultaneously. For Full Duplex or simultaneous operations of the send and receive data circuits it is necessary to provide a send clock circuit similar in structure to counter 17, trigger 18, latch 21 and AND's 19, 20, 22 and 23. This would operate directly from A pulses without provisions for advancing or retarding the counter.

While the invention has been particularly shown and described with reference to a preferred embodiment thereof, it will be understood by those skilled in the art that various changes in form and details may be made therein without departing from the spirit and scope of the invention.

What is claimed is:

1. In a data receiving terminal the improvements in means for maintaining the terminal in synchronism with a transmitting terminal comprising:

(a) a clock (10–11–12–13–17–18) for producing timing pulses,
(b) a data input line (38),
(c) clock controlling means (latch 28) responsive to the received data signals occurring on said data input line (38) for rendering said clock operative (a) above,
(d) a data bit storing device (latch 31), and
(e) clock correcting means (advance gate latch 54 and retard gate latch 55) responsive to said bit storing device (latch 31) for selectively advancing or retarding said clock (a) above.

2. In a data receiving terminal the improvements in means for maintaining the receiving terminal in synchronism with the transmitting terminal comprising:

(a) timing pulse generating means (10–11–12–13–17–18),
(b) a data receiving input line (38),
(c) a first bit storing element (latch 31) coupled with said data receiving input line (38),
(d) a second bit storing element (latch 35) coupled with said first bit storing element (latch 31),
(e) means (C strobe pulse output from &22, D strobe pulse output from &23) for transferring a bit from said first bit storing element (latch 31) to said second bit storing element (latch 35),
(f) clock correcting means (advance gate latch 54 and retard gate latch 55) responsive to said first bit storing element (latch 31) and coupled with said timing pulse generating means (a) above for selectively advancing or retarding the same,
(g) means (OR 43) for comparing the bits stored in first and second bit storing elements (latches 31 and 35), and
(h) bistable trigger means (36) responsive to the comparing means (OR 43) for transferring receive data bits into a main store of the data terminal.

3. In a data receiving terminal the improvements in means for maintaining the receiving terminal in synchronism with the transmitting terminal comprising:

(a) timing pulse generating means (10–11–12–13–17–18),
(b) a data receiving input line (38),
(c) control means (latch 28, &15, OR 16) for said timing pulse generating means coupled with said data receiving input line (38) and responsive thereto for rendering the timing pulse generating means operative at the beginning of a data message transmission and for maintaining the timing pulse generating means in synchronism with the message rate of the transmitting station,
(d) a first bit storing element (latch 31) coupled with said data receiving input line (38),
(e) a second bit storing element (latch 35) coupled with said first bit storing element (latch 31),
(f) means (C strobe pulse output from &22, D strobe pulse output from &23) for transferring a bit from said first bit storing element (latch 31) to said second bit storing element (latch 35),
(g) clock correcting means (latches 54 and 55) responsive to said first bit storing element (latch 31) and coupled with said control means (&15 OR 16) for selectively advancing or retarding said timing pulse generating means,
(h) means (OR 43) for comparing the bit stored in first and second bit storing elements (latches 31 and 35), and
(i) means (trigger 36) responsive to the comparing means (OR 43) for transferring receive data bits into a main store of the data terminal.

4. In a data receiving terminal the improvements in means for maintaining the terminal in synchronism with a transmitting terminal comprising:

(a) clock for producing timing pulses (10–11–12–13–17–18),
(b) a data input line (38),
(c) clock controlling means (latch 28) responsive to the received data signals occurring on said data input line (38) for rendering said clock operative (a) above,
(d) a first data bit storing device (latch 31),
(e) a second data bit storing device (latch 35),
(f) means (C stroke pulse output from &22, D strobe pulse output from &23) for transferring data bits from said first bit storing device (latch 31) to said second bit storing device (latch 35),
(g) clock correcting means (advance gate latch 54 and retard gate latch 55) responsive to said first bit storing device (latch 31) for selectively advancing or retarding said clock (a) above,
(h) means (OR 43) for comparing the bits stored in said first and second data bit storing devices (latches 31 and 35), and
(i) means (trigger 36) responsive to said comparing means (OR 43) for transferring received data bits into a main store of the receiving data terminal.

5. In a data communications system having a pair of data terminals intercoupled by communication lines the improvements in the receiving terminal comprising:

(a) timing pulse generating means (10–11–12–13–17–18),
(b) a receive data input line (38),
(c) control means (latch 28, &15, OR 16) for said timing pulse generating means coupled with said receive data input line (38) and responsive thereto for rendering said pulse generating means operative at the beginning of the data message transmission and for maintaining said timing pulse generating means (a) above in synchronism with the message rate of the transmitting station,
(d) a first bit storing element (latch 31) coupled with said receive data input line (38),
(e) a second bit storing element (latch 35) coupled with said first bit storing element (latch 31),
(f) means (C strobe pulse output from &22, D strobe pulse output from &23) for transferring a bit from said first bit storing element (latch 31) to said second bit storing element (latch 35),
(g) means (OR 43) for comparing the bits stored in said first and second bit storing elements (latches 31 and 35), and
(h) means (36) responsive to the comparing means (OR 43) for transferring received data bits into a main store of the data terminal.

6. In a data communications system having a pair of data terminals intercoupled by communication lines, the improvements in the receiving terminal comprising:

(a) timing pulse generating means (10–11–12–13–17–18).
(b) a receive data input line (38), (c) control means (latch 28, &15, OR 16) for said timing pulse generating means coupled with said receive data input line (38) and responsive thereto for rendering said pulse generating means operative at the beginning of the data message transmission and for maintaining said timing pulse generating means in synchronism with the massage rate of the transmitting station, (d) a first bit storing element (latch 31) coupled with said receive data input line (38), (e) a second bit storing element (latch 35) coupled with said first bit storing element (latch 31), (f) means (C strobe pulse output from &22, D strobe pulse output from &23) for transferring a bit from said first bit storing element (latch 31) to said second bit storing element (latch 35), (g) means (OR 43) for comparing the bits stored in said first and second bit storing element (latches 31 and 35), (h) bistable trigger means (36) responsive to the comparing means (OR 43) for transferring received data bits into a main store of the data terminal, and (i) sending circuits (send trigger 37 and associated & and OR inputs) for transferring data from the data terminal to the communication lines.

7. In a data receiving terminal the improvements comprising:

(a) a non-continuously running clock for producing timing pulses (10–11–12–13–17–18), (b) a data input line (38), (c) means latch (28) responsive to the receive data signals occurring on said data input line (38) for rendering said clock operative (a) above, (d) a first data bit storing device (latch 31), (e) a second data bit storing device (latch 35), (f) means (C stroke pulse output from &22, D strobe pulse output from &23) for transferring data bits from said first bit storing device (31) to said second bit storing device (latch 35), (g) clock correcting means (advance latch 54 and retard latch 55) responsive to said first bit storing device (latch 31) for selectively advancing or retarding said clock (a) above, (h) means (OR 43) for comparing the bits stored in said first and second data bit storing devices (latches 31 and 35), and (i) transferring means (36) responsive to said comparing means (OR 43) for delivering received data bits into a main store of the receiving data terminal.

8. In a data receiving terminal the improvements comprising:

(a) a non-continuously running clock for producing timing pulses (10–11–12–13–17–18), (b) a data input line (38), (c) clock controlling means (latch 28) responsive to the received data signals occurring on said data input line (38) for rendering said clock operative, (d) a first data bit storing device (latch 31), (e) a second data bit storing device (35), (f) means (C strobe pulse output from &22, D strobe pulse output from &23) for transferring data bits from said first bit storing device (latch 31) to said second bit storing device (latch 35), (g) clock correcting means (advance latch 54 and retard latch 55) responsive to said first bit storing device (latch 31) for selectively advancing or retarding said clock (a) above, (h) means (OR 43) for detecting transition conditions of the bits stored in said first and second data bit storing devices (latches 31 and 35), and (i) transferring means (36) responsive to said detecting means (OR 43) for delivering received data bits into a main store of the receiving data terminal.

References Cited

UNITED STATES PATENTS

| | | | |
|---|---|---|---|
| 3,112,363 | 11/1963 | Schramel et al. ---- | 178—69.5 X |
| 3,209,265 | 9/1965 | Baker et al. -------- | 328—72 X |

OTHER REFERENCES

IBM Technical Disclosure Bulletin, vol. 7, No. 12, May 1965, p. 1185.

ROBERT L. GRIFFIN, *Primary Examiner.*

JOHN W. CALDWELL, *Examiner.*

J. T. STRATMAN, *Assistant Examiner.*